April 23, 1963  R. MARIE  3,086,608
SPEED CONTROL DEVICE FOR AN AUTOMOTIVE VEHICLE
Filed May 13, 1960  2 Sheets-Sheet 1

INVENTOR.
Robert Marie,
BY
Davis, Lindsey, Hibben & Noyes
Atty's.

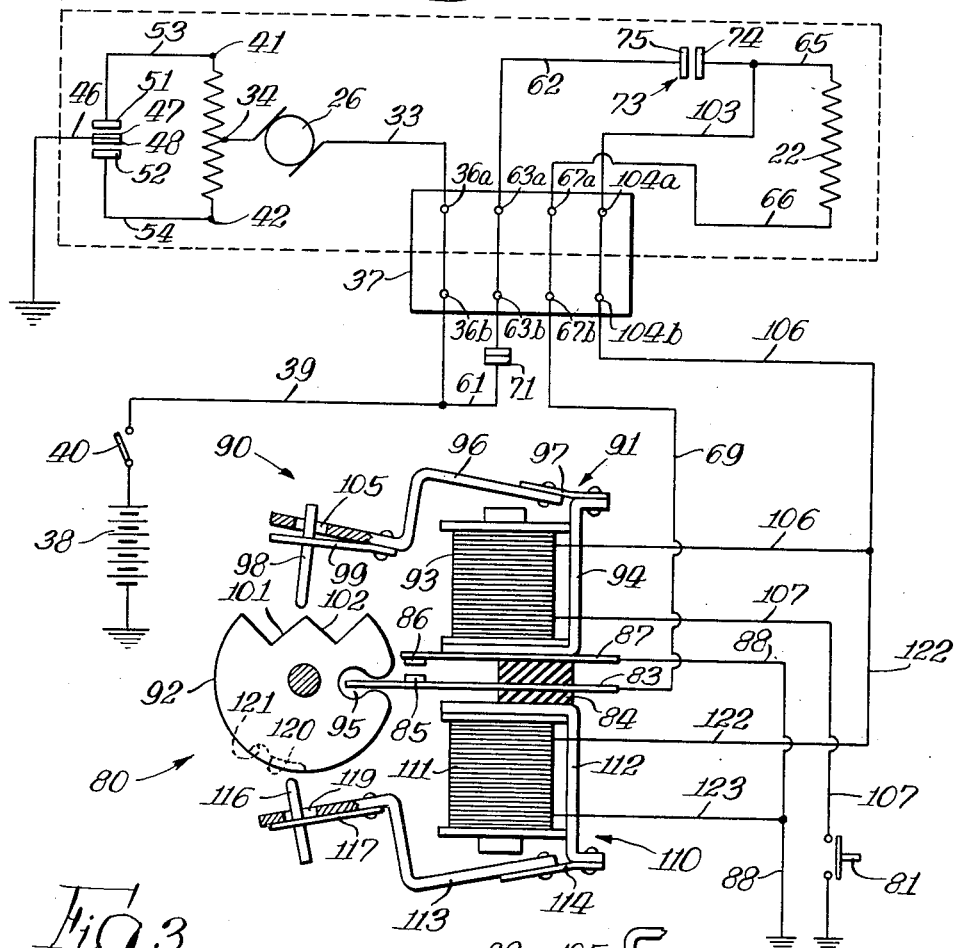

UnitedStatesPatent Office 3,086,608
Patented Apr. 23, 1963

3,086,608
SPEED CONTROL DEVICE FOR AN AUTOMOTIVE
VEHICLE
Robert Marie, Wayne County, Ind., assignor to Perfect
Circle Corporation, Hagerstown, Ind., a corporation of
Indiana
Filed May 13, 1960, Ser. No. 29,044
2 Claims. (Cl. 180—82.1)

This invention relates generally to speed control devices and more particularly to improvements in a speed control device for an automotive vehicle.

In the pending Ralph R. Teetor application patent entitled "Speed Control Device for an Automotive Vehicle," Serial No. 686,817, filed September 30, 1957, now patent No. 2,973,051, a speed control device for an automotive vehicle is disclosed and claimed which may be adjusted for a predetermined vehicle speed, and when such speed is reached, provides a resistance to advancing movement of the accelerator pedal. The device also includes a manually operable control whereby the vehicle may be maintained at such speed with the driver's foot removed from the accelerator pedal. When the device is thus operating automatically to maintain the vehicle speed, the device may be disabled for such automatic operation by depression of the brake pedal of the vehicle, thus returning the vehicle to normal control by the driver.

The general object of the present invention is to provide a manual control for so disabling the automatic operation of the vehicle.

Another object is to utilize the manually operable control not only for establishing automatic operation but also to disable such automatic operation.

A further object is to provide a manually operable control which on successive actuations thereof establishes such automatic operation of the vehicle and then disables such automatic operation.

Other objects and advantages become apparent from the following description taken in connection with the accompanying drawings, in which:

FIG. 2 is a diagrammatic view showing the control of the device of FIG. 1;

FIG. 3 is a fragmentary view of a portion of the structure of FIG. 2, showing the parts thereof in one operative position; and FIG. 4 is a view similar to FIG. 3 and showing the parts thereof in another operative position.

Figure 1:
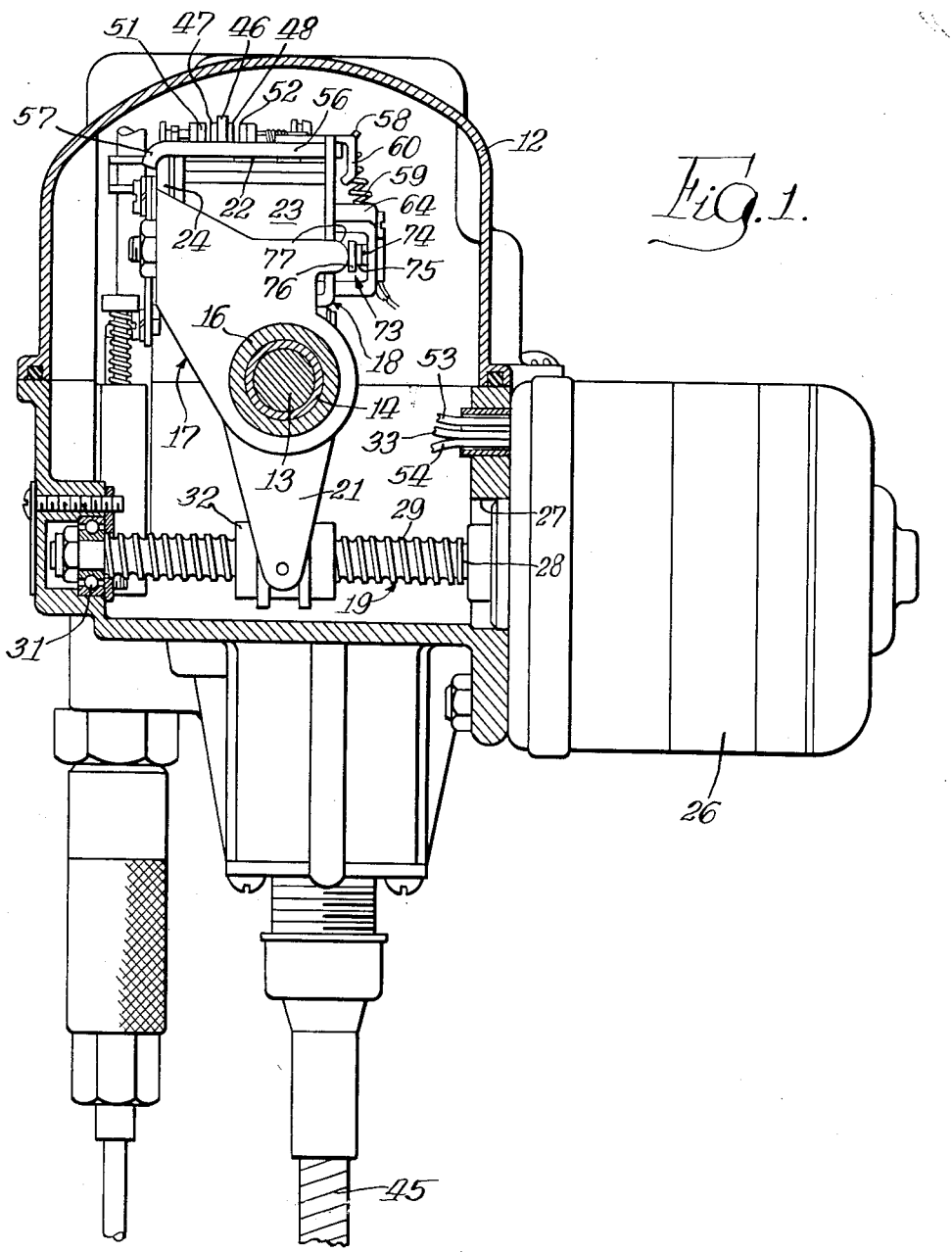
FIG. 1 is a sectional view showing a speed control device embodying the features of the invention.

In the above mentioned patent, a speed control device is disclosed, which is operable to offer resistance to advancing movement of the accelerator pedal or throttle control member when the latter is advanced to a position for maintaining the vehicle at a predetermined vehicle speed so that the driver is made aware of the fact that the vehicle is traveling at the predetermined speed. Such a device is also operable to automatically maintain the vehicle at a substantially constant predetermined speed without requiring the driver to actuate the accelerator pedal, the device being effective to maintain the predetermined speed regardless of changing road conditions. When the device is operating automatically, it may be rendered inoperable for such automatic operation by actuation of the brake pedal.

A speed control device embodying the present invention is preferably adapted to be mounted under the hood of a vehicle (not shown) and is connected to the accelerator pedal or throttle control member by intermediate linkage (not shown). The device includes a housing 12 that is adapted to be secured to a bracket (not shown) for mounting the device on the vehicle. Most of the movable parts of the device are supported on a stationary shaft 13 which extends through a wall of the housing 12, the shaft having a flange portion (not shown) intermediate its ends and secured to an interior wall of the housing 12. A bushing 14 is carried on the shaft 13 to provide a bearing surface for the hub portion 16 of an operating member 17 mounted for pivotal movement about the shaft 13 and within the housing 12. The hub portion 16 extends exteriorly of the housing 12, and is connected to the linkage between the throttle control member and throttle of the engine.

As heretofore mentioned, the device is adapted to provide resistance to advancing movement of the throttle control member when the vehicle reaches a predetermined speed and, in automatic operation, to maintain the speed of the vehicle substantially constant at the predetermined speed, such speed being adjustable. In order to provide such resistance to advancing movement, the device includes actuating means operable in one direction to move the throttle control member toward idle position when the vehicle exceeds the predetermined speed, and operable in the other direction to an out-of-the-way position to permit the throttle control member to be advanced. In the present instance, the actuating means includes an actuating member or element 18 and electrical drive means, indicated generally at 19, for moving the actuating member 18.

The actuating member 18, in this instance, comprises a lever that is rotatably mounted on the shaft 13. The actuating member 18 thus includes a yoke having a pair of spaced downwardly extending arms 21 pivotally mounted on the shaft 13, and a platform portion on which an electromagnet 22 is mounted and enclosed by a casing 23. The operating member 17 has its upper end bent to form a laterally extending plate or engaging portion 24 parallel to the axis about which the member 17 rotates and adapted to engage the casing 23. Thus, the electromagnet casing 23 acts as a stop or abutment to limit advancing movement of the accelerator pedal when the device is set to provide resistance.

The electrical drive means 19, in this instance, comprises a reversible electric motor 26 mounted on the exterior of the housing 12, the latter being provided with an opening 27 through which the shaft portion, indicated at 28, of the motor 26 extends. In order to provide the desired speed reduction and power with a minimum number of parts so that a relatively small motor may be used, the connection between the motor 26 and actuating member 18 is of the screw and nut type. Thus, the shaft portion 28 extending into the housing 12 is in the form of a screw 29, the remote end of which is rotatably journaled in a bearing assembly 31 in an opposite wall of the housing 12. A nut 32 of rectilinear form is mounted on the screw 29 and disposed between the lower ends of the arms 21 and operatively connected thereto. Energization of the motor 26 in either direction is effective to move the nut 32 along the screw 29 to pivot the actuating member 18 in opposite directions about the shaft 13.

The operating member 17 is adapted to be swung in a clockwise direction as viewed in FIG. 1 when the accelerator pedal is advanced to open the throttle of the engine. When the predetermined speed of the vehicle is attained, the motor 26 is adapted to be energized for rotation in a direction to move the actuating member 18 in a counterclockwise direction into abutment with the operating member 17, and to swing the latter counterclockwise if necessary. Thus, the screw 29 will be rotated in such direction as to move the nut 32 to the right, as viewed in FIG. 1.

Current is supplied to the armature of the motor 26 by a wire 33 (FIGS. 1 and 2) which is connected to a point 34 intermediate the ends of its field winding, the wire 33 being connected to an internal terminal 36a on a terminal block 37 which extends internally and externally of the housing 12. The terminal 36a is connected through the block 37 to an external terminal 36b, the latter being connected to the vehicle battery, indicated at 38 in FIG. 2, by a wire 39. The ignition switch, indicated at 40, of the vehicle is interposed in the wire 39. The respective sides of the field winding of the motor 26, indicated at 41 and 42, are adapted to be selectively grounded to the frame of the vehicle to provide the reversible characteristics thereof.

Energization of the motor 26 to effect counterclockwise rotation of the actuating member 18 at a predetermined vehicle speed is dependent on the movement of the operating member 17 and means responsive to the speed of the vehicle, comprising, in this instance, a governor (not shown) mounted within the housing 12. The governor is driven by a cable 45 connected to and driven by the propellor shaft of the vehicle. The govenor includes a pivotally mounted arm 46 movable counterclockwise as viewed in FIG. 1 when the predetermined vehicle speed is attained. The arm 46 has a pair of contacts 47 and 48 carried on opposite side faces of the upper end thereof, the contacts being effective to selectively ground the respective sides of the field winding and thus complete circuits through the motor 26 to energize the latter for rotation in opposite directions.

To this end, a second pair of contacts 51 and 52 are carried respectively by the operating and actuating members 17 and 18 for cooperation with the contacts 47 and 48. Thus the contact 51 is carried by but insulated from the engaging portion 24 of the operating member 17 and the contact 52 is carried by but insulated from the actuating member 18. Each of the contacts 51 and 52 is connected by wires 53 and 54, respectively, to the sides 41 and 42 of the field winding of the motor 26.

With the foregoing structure, when the operating member 17 is swung clockwise as viewed in FIG. 1 by advancing the accelerator pedal, the speed of the vehicle increases. When the vehicle reaches the predetermined speed, the governor swings the arm 46 counterclockwise. The contacts 47 and 51 thus move into engagement and the side 41 of the field winding of the motor 26 is thereby grounded. The motor 26 will thus be energized for one direction of rotation, such as is required to move the nut 32 to the right. Such movement will cause the actuating member 18 to be swung counterclockwise until the electromagnet casing 23 engages the laterally extending portion 24 of the operating member 17, thus resisting further advancing movement of the throttle control member. Continued movement of the actuating member 18 pushes the operating member 17 in a counterclockwise direction until the contacts 47 and 51 separate, thereby opening the motor circuit and stopping the motor. If the driver wishes to maintain the predetermined speed, he merely holds the accelerator pedal at the position where the laterally extending portion 24 abuts the electromagnet casing 23 and the resistance is felt. Because of the screw and nut connection between the actuating member 18 and the motor 26, rotation thereof and movement of the actuating member 18 cannot be obtained by pressure on the accelerator pedal. A spring is interposed in the connection between the device and the throttle control linkage in order to permit the driver to overcome this resistance in the event of an emergency or other condition where the driver wishes to increase the speed of the vehicle beyond that at which resistance occurs.

Conversely, if the driver permits the accelerator pedal to move toward idle position, or if road conditions result in a decrease in vehicle speed, the governor will cause the arm 46 to be moved in a clockwise direction, as viewed in FIG. 1, thereby bringing the contact 48 into engagement with the contact 52 on the actuating member 18. The motor 26 is thus energized for rotation in the opposite direction causing the actuating member 18 to be swung in a clockwise direction about the shaft 13 and out of engagement with the laterally extending portion 24 of the operating member 17. The resistance to advancing movement of the accelerator pedal is thus removed and the driver is free to depress the pedal to a position to compensate for the condition causing the decrease in speed. When the actuating member 18 moves clockwise far enough to disengage the contact 52 from the contact 48 on the governor arm 46, the motor will be stopped.

As heretofore mentioned, the speed control device is adapted to automatically maintain the vehicle at a substantially constant predetermined speed with the driver's foot removed from the accelerator pedal. To this end, the actuating means includes means under the control of the driver and operable to couple the operating member 17 to the actuating member 18 so that the accelerator pedal or throttle control member will be held in a position or be moved to maintain the vehicle at the predetermined speed. The coupling means comprises the electromagnet 22, an armature plate 56 hingedly mounted on the electromagnet casing 23, and a hook or lip 57 carried by the armature plate 56 and adapted to engage the laterally extending portion 24 to hold the latter engaged with the electromagnet casing 23. The armature plate 56 includes a finger 58 to which a spring 59 is connected to normally swing the plate 56 upwardly out of engagement with the casing 23. A downwardly extending arm or stop 60 (FIG. 1), is also carried by the plate 56 and it is adapted to engage a side of the electromagnet casing 23 to limit the extent of upward movement of the plate 56. Due to the provision of the spring 59, the hook 57 is operative to hold the operating member 17 and the actuating member 18 in engagement, only when the electromagnet 22 is energized.

Current is supplied to the electromagnet 22 from the vehicle battery 38 by a wire 61 (FIG. 2) which is connected at one end to the wire 39 and at its other end to an external terminal 63b on the terminal block 37. A normally closed switch 71 is interposed in the wire 61 and is adapted to be opened by the slightest actuation of the brake operating member or pedal of the vehicle, thereby to disable the automatic operation of the device. The terminal 63b is connected to an internal terminal 63a on the terminal block 37, and the latter is connected by a wire 62 to a terminal on an insulating block 64 (FIG. 1) carried by the actuating member 18. Another terminal on the block 64, which is connected to the first terminal, is connected by a wire 65 to one side of the electromagnet 22. The other or ground side of the electromagnet 22 is connected by a wire 66 to an internal terminal 67a on the block 37. The terminal 67a is connected to an external terminal 67b on the block, and a wire 69 connects the terminal 67b to the manually controlled means of the present invention indicated generally at 80 for grounding the electromagnet 22.

In order to prevent energization of the electromagnet 22 and downward movement of the coupling armature 56 prior to the time the operating member 17 engages the casing of the electromagnet, means is provided in the form of a normally open switch 73 (FIGS. 1 and 2) interposed between the wire 62 and the wire 65 and on the block 64 to connect the electromagnet 22 with the battery. The switch 73 is adapted to be closed only when the laterally extending portion 24 of the operating member 17 engages the electromagnet casing 23. The switch 73 includes a pair of normally spaced or open contacts 74 and 75, one of which is mounted on a flexible arm 76 (FIG. 1) within the block 64 and adapted to be engaged by a finger 77 projecting from the operating member 17. The finger 77 is effective to bend the arm 76 and move the contact 75 into engagement with the contact 74, thereby closing the switch 73 to connect the electromagnet 22 with the battery.

According to the present invention, it is desirable in the interests of safety and convenience of operation to be able to selectively engage or disengage the device to bring the vehicle under automatic operation or to return the vehicle to conventional operation without the necessity of depressing the brake pedal or opening the ignition switch. It is further desirable to provide a manually controlled member for accomplishing the foregoing by successive manipulations of the member. The control means 80 of the present invention is arranged to selectively control the energization or deenergization of the electromagnet 22 to achieve this result.

The control means 80 is preferably of the electromechanical type and generally comprise a manually operable control member or push-button switch 81 for energizing means for closing a switch in circuit with the electromagnet 22 on first operation of the switch 81, and means for maintaining the circuit closed when the switch 81 is released. On the next operation of the switch 81, the above mentioned means is operable to open the circuit.

In the embodiment of the invention illustrated in FIG. 2, the wire 69 from the electromagnet 22 is connected to one end of an elongated conductor member 83 mounted in an insulating block 84. On the other end of member 83 is a contact 85. The member 83 is flexible so that the contact 85 may be moved into engagement with a contact 86 mounted on one end of another conductor member 87 spaced from the member 83 and mounted on the insulating block 84. The other end of the conductor member 87 is grounded by a wire 88.

The conductor member 83 is adapted to be flexed to move the contact 85 into engagement with the contact 86 by mechanical means indicated generally at 90 and operated by a relay means 91 energized by the push-button or switch 81. The means 90 comprises a rotatable disk 92 having a slot 95 formed in its periphery. The conductor member 83 is longer than the conductor member 87 and extends into the slot 95. Thus, on counterclockwise rotation of the disk 92, the contact 85 is moved into engagement with the contact 86, as shown in FIG. 3, to energize the electromagnet 22. The rotation of the disk 92 and a selective closing or opening of the contacts 85 and 86 is effected by successive operations of the relay means 91. In the present instance, the relay means comprises a magnet coil 93 carried by a bracket 94 mounted on the vehicle, preferably under the hood. Cooperating with the magnet coil 93 is an armature or lever 96 pivotally secured to the upper end of the bracket 94 for movement toward and away from the coil 93. A spring member 97 hingedly interconnects the lever 96 with the bracket 94 and tends to hold the lever in an upwardly pivoted position away from the magnet coil 93 as in FIG. 2. The outer end of the lever 96 is provided with a portion for engaging the disk 92 to cause rotation thereof in opposite directions. Such portion preferably comprises a pin 98 flexibly mounted at one end of a spring member 99, the latter being secured at one end to the lever 96. The spring member 99 is bent so that it is inclined away from the lever 96. The pin 98 is movable by flexure of the spring 99 against the underside of the arm 96, the upper end of the pin 98 extending through an opening 105 in the end of the lever 96.

The disk 92 is provided with a pair of V-shaped notches 101 and 102 in the periphery thereof, the notches 101 and 102 being arranged in side-by-side relation and having side walls adapted to cam the pin 98 to the bottom of either notch upon engagement therewith. Thus, when the coil 93 is energized and the lever 96 is drawn downward, the pin 98 is driven into engagement with one or the other of the notches 101 or 102. If the parts are in the position shown in FIG. 2, the pin 98 will engage the notch 101 and rotate the disk 92 in a counterclockwise direction to the position shown in FIG. 3 to close the contacts 85 and 86. If the parts are in the position shown in FIG. 3, the pin 98 will engage the notch 102 and rotate the disk 92 clockwise to the position shown in FIGS. 2 and 4 to open the contacts 85 and 86.

Thus, assuming that the contacts 85 and 86 are open as shown in FIG. 2, closure of the manually operable switch 81 energizes the magnet coil 93. The pin 98 is therefore driven downwardly into the notch 101 to rotate the disk 92 and close the contacts 85 and 86. The electromagnet 22 is thereby energized and the device will then automatically operate the vehicle at the predetermined speed. Of course, the magnet coil 93 cannot be energized by closure of the switch 81 until the switch 73 has been closed by movement of the operating member 17 into engagement with the electromagnet casing 23.

Current is supplied to the magnet coil 93 through a branch circuit in parallel with the electromagnet 22. Thus, a wire 103 is connected to the wire 65 between the switch 73 and electromagnet 22 within the housing 12 (FIG. 2). The wire 103 is connected to an internal terminal 104a on the block 37, and then through the block 37 to an external terminal 104b. A wire 106 is connected to the terminal 104b and thence to one side of the magnet coil 93. The other side of the coil 93 is connected by a wire 107 to the switch 81 and thence to ground.

With the foregoing construction, it would be necessary however for the driver to hold the switch 81 closed at all times in order to maintain the vehicle under automatic operation because an opening or release of the switch 81 would deenergize the magnet coil 93, thereby permitting the contacts 85 and 86 to open due to the resilience of the end of the arm 83 in the slot 95. In order to eliminate the necessity for holding the switch 81 closed, the mechanism 80 includes means, indicated generally at 110, for holding the disk 92 in a contact closing position after the switch 81 has released. The means 110 comprises, in this instance, a second delay having a construction substantially identical to that of the first relay means 91. The second relay thus comprises a magnet coil 111 mounted on a bracket 112 disposed on the opposite side of the insulating block 84. An armature or lever 113 is pivotally mounted at the lower end of the bracket 112 by means of a spring member 114 in the same manner as in the first relay means 91, the lever 112 thus being normally maintained in a downwardly pivoted position away from the disk 92, as illustrated in FIG. 2.

The outer end of the lever 113 is provided with a portion in the form of a detent 116 for engaging the disk 92 to hold it in a particular position. The detent 116 is in the form of a pin secured to one end of a spring member 117 which is secured at its other end to the lever 113 at the lower side thereof as by a rivet. In normal position, the spring member 117 has its upper surface in abutment with the underside of the outer end of the lever 113, the upper end of the detent 116 thus extending through an opening 119 in the end of the lever 113. The spring member 117 thus permits flexure of the detent 116 relative to the lever 113.

The detent 116 holds the disk 92 against rotation when the contacts 85 and 86 are in engagement. To this end, the periphery of the disk 92 is provided with a circumferential groove or recess 120 having a deeper pocket portion 121 at one end thereof. The end of the detent 116 is received in the groove 120 and, when the disk 92 is rotated fully in a counter-clockwise direction as in FIG. 3, the end of the detent 116 enters the pocket 121 to hold the disk against rotation. The frictional force of the detent 116 in the slot 120 or pocket 121 is not sufficient to prevent the torsional force applied to the disk 92 by the pin 98 upon downward movement of the lever 96 from rotating the disk. The disk 92 can thus be rotated while the detent 116 is disposed in the groove 120 or pocket 121 between the positions shown in FIGS. 3 and 4 without having to deenergize the coil 111.

The magnet coil 111 is adapted to be energized when the switch 73 is closed. Thus, current is supplied to one side of the magnet coil 111 by a wire 122 which is connected to the wire 106. The ground side of the magnet coil 111 is connected by a wire 123 to the wire 88, and thus to ground.

In operation, after the operating member 17 is brought into engagement with the casing 23 of the electromagnet 22 and the switch 73 (FIGS. 1 and 2) has closed, the coil 111 will be energized, thus drawing the lever 113 upwardly and the detent 116 into the groove 120. Thereafter, the driver need only momentarily close the switch 81 to bring the vehicle under automatic operation. Closure of the switch 81 energizes the magnet coil 93 drawing the lever 96 down and driving the pin 98 into engagement with the notch 101 to rotate the disk 92 in a counterclockwise direction, thereby bending the end of the arm 83 upwardly to close the contacts 85 and 86, as illustrated in FIG. 3. The electromagnet 22 is thus grounded through the wire 88 and the vehicle will then be under automatic operation. The counterclockwise rotation of the disk 92 permits the detent 116 to enter the pocket 121 to hold the disk against rotation so that the contacts 85 and 86 will then remain closed. The driver thus may release the switch 81 but the vehicle will continue to be operated automatically because the electromagnet 22 remains energized. After the switch 81 is opened, the coil 93 will be deenergized, thereby permitting the lever 96 and pin 98 to swing upwardly to the inoperative position illustrated in FIG. 2.

Should the driver at any time decide to return the vehicle to conventional operation, he need only close the switch 81 again. Such action will again energize the coil 93 causing the lever 96 to be drawn down and the pin 98 driven into engagement with the disk 92, this time in the notch 102. Because of the angularity of the walls of the notch 102 when the disk 92 is in the position shown in FIG. 3, the pin 98 will be cammed to the bottom of the notch 102 to thereby cause the disk 92 to rotate in a clockwise direction to the position shown in FIG. 4. The contacts 85 and 86 are thus opened, the electromagnet 22 deenergized, and the vehicle returned to conventional operation. Opening the switch 81 again permits the lever 96 to pivot upwardly to an inoperative position, the disk 92 however remaining in the position illustrated in FIG. 4, which is the same as its initial or inoperative position shown in FIG. 2. The disk 92 is thus in a position to be again rotated in a counterclockwise direction to repeat the cycle. Successive manipulations of the switch 81 will thus cause the vehicle to be operated automatically or to be returned to conventional operation so long as the switch 73 is closed.

The unit is "fail-safe" in that any failure of voltage or an open circuit will prevent completion of the ground circuit through the electromagnet 22. In addition, the natural resilience of the flexible arm 83 is sufficient to rotate the disk 92 about its axis to cause the contact 85 to move away from the contact 86 whenever the magnet coil 111 is deenergized.

I claim:
1. In a speed control device for an automotive vehicle having a throttle control element, said device including an operating member movable with said throttle control element, actuating means engageable with said operating member, coupling means comprising an electromagnet and an armature for coupling said actuating means to said operating member, said actuating means being operable in one direction to advance the throttle control element when the vehicle is below a predetermined speed and said actuating means and operating member are coupled, said actuating means also being operable in the other direction to move the throttle control element toward idle position when the vehicle exceeds said predetermined speed, whereby said vehicle is maintained substantially at said predetermined speed, mechanism for energizing and deenergizing said electromagnet including a pair of contacts in circuit with said electromagnet, a rotatable disk having a slot in its periphery, and a flexible resilient arm having one end extending into said slot and having one of said contacts mounted thereon, the resiliency of said arm tending to rotate said disk to a position where said contacts are open, relay means comprising a magnet coil and a lever movable by said magnet coil into engagement with said rotatable disk on successive energizations of said magnet coil for moving the disk in opposite directions for opening and closing said pair of contacts, said mechanism further including a detent movable into engagement with said disk for holding the latter in a position closing said pair of contacts, and a second relay energized when said actuating means and operating member are in engagement for urging said detent into engagement with said disk, and a control member for selectively and successively energizing and deenergizing said magnet coil.

2. The combination according to claim 1, in which said actuating means carries a switch in circuit with said second relay, and said switch is closed when said operating member and said actuating means are engaged.

References Cited in the file of this patent
UNITED STATES PATENTS

| | | |
|---|---|---|
| 990,512 | Barnum | Apr. 25, 1911 |
| 2,021,041 | Altamura | Nov. 12, 1935 |
| 2,295,484 | Krieger | Sept. 8, 1942 |
| 2,714,880 | Riley | Aug. 9, 1955 |
| 2,902,559 | Morris | Sept. 1, 1959 |
| 2,973,051 | Teetor | Feb. 28, 1961 |